United States Patent Office 2,702,657
Patented Feb. 22, 1955

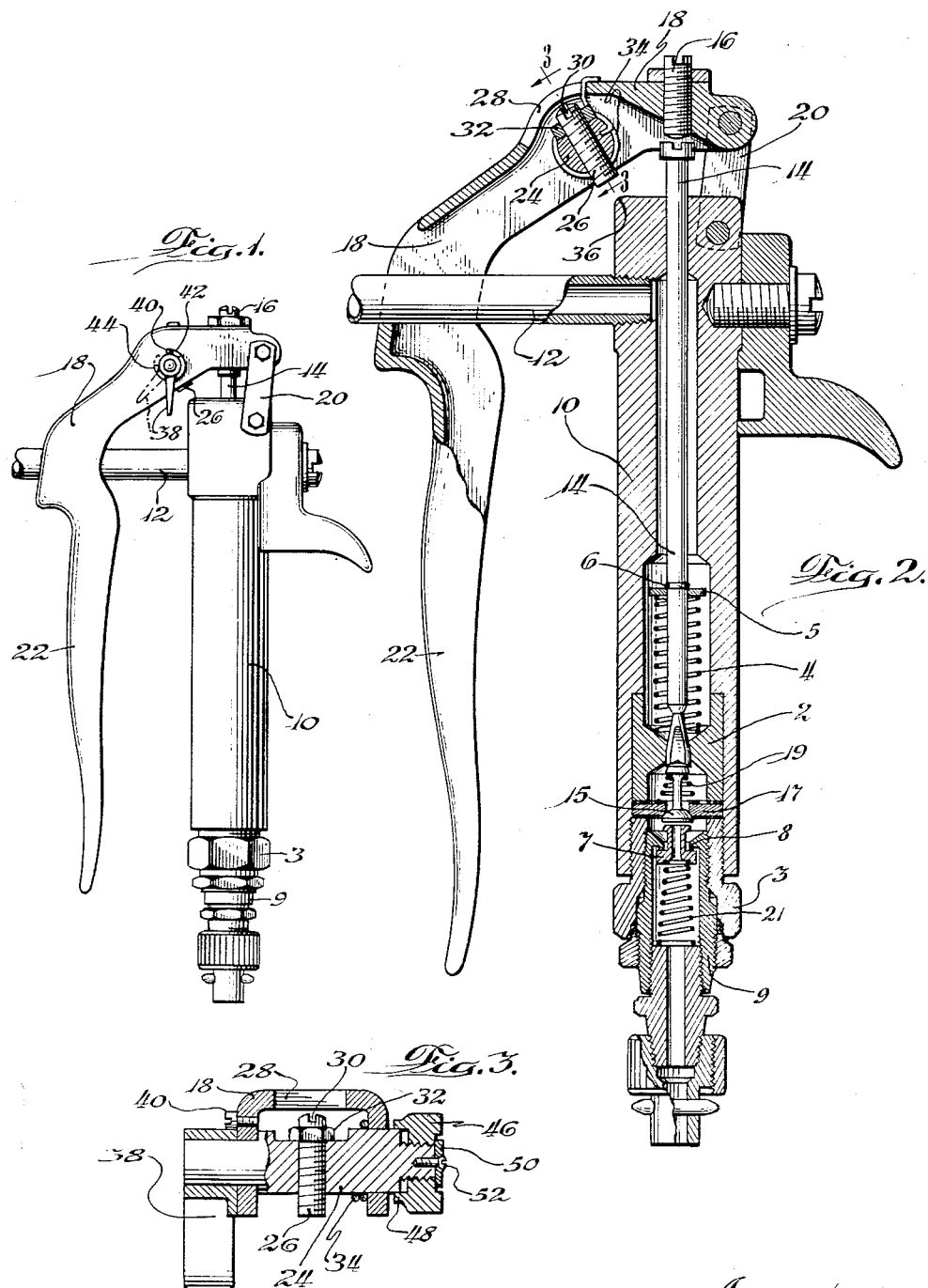

2,702,657

TRIPLE ACTION CONTROL VALVE

Ernest W. Davis, Oak Park, Ill.

Application August 19, 1949, Serial No. 111,232

5 Claims. (Cl. 222—359)

My invention relates to triple action control valves and is more particularly concerned with control valves adapted for use with lubricating apparatus.

In lubricating the bearings of automobiles and other machinery it is common to provide such bearings with lubricant receiving fittings or nipples. Lubricant is supplied to such fittings by manually or power operated pumps or compressors provided with couplers adapted to be successively attached and detached to the fittings affixed to the various bearings. In power operated compressors of the type wherein lubricant is maintained under pressure, discharge of the lubricant through the coupler is controlled by a manually operated control valve ordinarily connected to the lubricant compressor by a flexible hose. It is to such control valves that my invention pertains.

More particularly, my invention is especially adapted for use with control valves such, for example, as that disclosed in United States Patent No. 2,042,970 of June 2, 1936 wherein a limited movement of the handle of the control valve will result in delivery of a predetermined quantity or so-called "shot" of lubricant, whereas a longer movement of the handle will produce a continuous discharge of lubricant as long as the handle is maintained in such position. In the control valve of this patent a difference in resistance to handle movement is relied upon to indicate to the operator the point at which handle movement for a shot is completed and handle movement for a continuous flow begins. In many instances it is desirable to provide means for positively limiting handle stroke to provide a shot of lubricant rather than a continuous flow.

An object of my invention is to provide a simple, light weight, compact, reliable and inexpensive stop mechanism which can readily be operated to provide either a shot discharge or a continuous discharge and which may be either quickly shifted from one to the other or set for permanent continuous discharge.

Other objects and advantages will become apparent as the description proceeds.

In the drawings:

Fig. 1 is an incomplete side elevation of a control valve embodying my invention;

Fig. 2 is a vertical section through the control valve; and

Fig. 3 is a partial sectional view taken on the line 3—3 of Fig. 2.

In Fig. 1 I have illustrated a control valve having a tubular body or casing 10. The lower end of the body is suited to serve as a handle and is adapted to be connected to a source of lubricant under pressure, such connections usually being effected by means of a flexible conduit. A rigid discharge pipe 12 is connected to the upper end of the tubular body and terminates in a coupler (not shown) for connecting the control valve with the lubricant receiving fitting or nipple attached to a bearing. Inside of the tubular body is valve mechanism of the kind disclosed in the said Letters Patent No. 2,042,970 for regulating the discharge of lubricant through the pipe 12 and coupler attached thereto. The valve mechanism is operated by a rod 14 whose upper end is engaged by an adjustable screw 16 mounted in a handle lever 18. One end of the handle lever 18 is pivotally attached to the upper end of the body 10 by links 20 and the other end 22 of the handle 18 forms a finger grip and is located generally parallel to the main part of the body 10 so that the operator's hand can enclose both the body and finger grip 22. Under these conditions, closure of the operator's hand and moving the finger grip 22 toward body 10 produces a downward movement of rod 14.

The lower end of the valve rod 14 is adapted to operate a valve 15 which is held against its seat in a valve seat washer 17 by a conical compression spring 19. The valve seat washer 17 is clamped in sealed relation between a valve rod guide member 2 and a bushing 3 which is threaded in the lower end of the body 10. The valve operating rod 14 is urged outwardly by a spring 4 which is compressed between the guide member 2 and a washer 5 which is held in place by a split ring keeper 6. The lower flat surface of the valve 15 is adapted to engage the upper end of a movable valve member 7 to close the passageway extending through the member. The valve member also operates as a valve against a seat 8 formed on a tubular part 9 which is threaded and sealed within the bushing 3, the valve member 7 being held against its seat 8 by a relatively strong coil spring 21.

During the time that the valve 15 moves away from its seat and the time it engages the upper surface of the valve member 7 to close the passageway therethrough, and the time that it returns to its seat in the washer 17, a certain small quantity or shot of lubricant will escape past the valve 15 and be discharged through the pipe 12. In operating the device in the manner as more fully described in the aforesaid Patent No. 2,042,970, the fact that the spring 21 was relatively strong, was relied upon to limit the downward stroke of the valve 15. It was intended that the operator should perceive the increased resistance to downward movement of the valve 15 and then relieve the force applied to the lever 22 and thereby permit the valve 15 to close, the flow during this time of travel of the valve away from and toward its seat being relied upon to determine the quantity of lubricant discharged. In the structure disclosed in this application, however, additional more positive means are provided to limit the down stroke of the valve 15 when shots of lubricant are to be dispensed. It will be understood that when it was desired to dispense the lubricant in a continuous stream, the operator pressed the finger grip more tightly, causing the valve 15 to push the valve member 7 outwardly and thereby permit flow of lubricant around this valve member and through the opening in the seat washer 17 upwardly and outwardly through the discharge pipe 12.

My novel mechanism includes a shiftable limit stop comprising a support shaft 24 rotatably mounted in the U-shaped central portion of the handle 18, as is most clearly shown in Fig. 3. Passing through the axial center of the shaft 24 is a stop screw 26 which may be adjusted by inserting a screw driver or other suitable tool through the opening 28 to engage the kerf 30 in the head of the screw. A lock nut 32 holds the screw 26 in adjusted position.

A spring 34 normally holds the shaft 24 and screw 26 in the position shown in Fig. 2. In this position the screw 26 engages the upper corner 36 of body 10 after the handle 18 has moved a relatively short distance. In operation, the screw 26 is adjusted so that this short movement of the handle 18 corresponds to the amount of movement required to deliver a shot of lubricant to the bearing.

One end of the shaft 24 is provided with a trigger 38 which is so positioned that it can be easily engaged by the thumb of the operator. If the operator desires a continuous flow of lubricant such as is required to fill a housing or other substantial space, he places his thumb in engagement with the trigger 38 and moves it to the dotted line position shown in Fig. 1. This brings the stop screw 26 to such a position that it will not engage the shoulder 36 and permits a long stroke of the handle 18. As soon as the operator removes his thumb from the trigger 38 this trigger is returned to the full line position of Fig. 1 by the spring 34. Movement of the shaft 24 by spring 34 and trigger 38 is limited by an abutment screw 40 located between opposing shoulders 42 and 44 (Fig. 1) provided by the hub of trigger 38.

In the usual course of lubricating automobiles and similar machines, continuous flow of lubricant for any appreciable time is ordinarily not required and most bearings are lubricated by shots of lubricant. It is therefore convenient for the triple acting stop mechanism to be set so that the ordinary discharge is a shot and a continuous flow can only be obtained by holding the trigger in the dotted line position shown in Fig. 1 against the tension of spring 34. However, if it is desired to provide repeated continuous flow discharges, a knurled nut 46 attached to one end of shaft 24 may be tightened so that the inner end 48 of this nut frictionally engages the adjacent portion of the handle 18 and holds the trigger and its shaft in a position corresponding to the dotted line position of Fig. 1. Thereafter whenever shot operation is desired the nut 46 may be unscrewed to permit spring 34 to return shaft 24 and trigger 38 to normal position. In order to prevent loss of the nut 46 I preferably provide means to prevent accidental separation of this nut from the shaft 24. This means may constitute a plate 50 secured to the end of the shaft 24 by a screw 52.

While I have illustrated and described only a single embodiment of my invention, it is to be understood that my invention may assume numerous forms and includes all modifications, variations and equivalents coming within the scope of the appended claims.

I claim:

1. A hand valve for passing fluid either in predetermined quantities or as a continuous flow, comprising, in combination, a first element including a valve casing having a handle portion thereon, a second element including an actuating lever pivotally mounted on said casing and having a handle portion positioned in relation to said casing handle portion to be gripped by the hand of the user grasping the latter, flow control valve means in said casing comprising a first and normally closed valve, a second and normally open valve adapted to be closed upon movement of said first valve to a first open position, and a third and normally closed valve adapted to be opened by movement of said first valve in the same direction to a second open position, said valve means passing a predetermined quantity of fluid while said first valve is being moved between closed position and said first open position in which it closes said second valve and passing a continuous flow of fluid when said first valve is moved beyond said first open position and to said second open position in which it opens said third valve, a valve operating member connected to said valve means and mounted in said casing to be actuated by said lever, said operating member being shiftable to a predetermined position to move said first valve to said first open position and being shiftable in the same direction beyond said predetermined position to move said first valve to said second open position and to open said third valve, a shiftable limit stop movably mounted on one of said elements, a spring biasing said limit stop to an operative position to engage the other of said elements to terminate opening movement of said actuating lever upon movement of said operating member to said predetermined position to permit said valve means to pass a predetermined quantity of fluid, and manual shifting means connected to said limit stop and positioned to be operated by the hand of the user grasping said casing handle portion to shift said limit stop to an inoperative position to permit extended movement of said actuating lever forcing said operating member beyond said predetermined position whereby said valve means may pass fluid in a continuous flow.

2. A hand valve comprising, in combination, a first element including a casing having a handle portion thereon, a second element including a lever pivotally supported on said casing and having a handle portion positioned in relation to said casing handle portion to be gripped by the hand of the user grasping the latter, flow control valve means in said casing comprising a first and normally closed valve, a second and normally open valve adapted to be closed upon movement of said first valve to a first open position, and a third and normally closed valve adapted to be opened by movement of said first valve in the same direction to a second open position, said valve means passing a predetermined quantity of fluid while said first valve is being moved between closed position and said first open position in which it closes said second valve and passing a continuous flow of fluid when said first valve is moved beyond said first open position and to said second open position in which it opens said third valve, a valve operating member connected to said valve means and mounted in said casing to be actuated by said lever, said operating member being shiftable to a predetermined position to move said first valve to said first open position and being shiftable in the same direction beyond said predetermined position to move said first valve to said second open position and to open said third valve, means for adjusting the angular relationship between said operating member and said lever to vary the normal position of the latter in relation to said casing handle portion, a support member rotatably mounted on one of said elements, an adjustable stop member carried by said support member, spring means acting on said support member to swing said stop member into operative position to engage the other of said elements to preclude extended movement of said actuating lever which would force said operating member beyond said predetermined position, and manual shifting means connected to said support member and positioned to be actuated by the user's hand grasping said casing handle portion to shift said stop member to an inoperative position permitting extended movement of said actuating lever to carry said operating member beyond said predetermined position to permit said valve means to pass fluid in a continuous flow.

3. A hand valve for passing fluid in predetermined quantities or as a continuous flow, comprising, in combination, a casing having a handle portion thereon, an actuating lever pivotally supported on said casing and having a handle portion positioned in relation to said casing handle portion to be gripped by the hand of the user grasping the latter, flow control valve means in said casing comprising a first and normally closed valve, a second and normally open valve adapted to be closed upon movement of said first valve to a first open position, and a third and normally closed valve adapted to be opened by movement of said first valve in the same direction to a second open position, said valve means passing a predetermined quantity of fluid while said first valve is being moved between closed position and said first open position in which it closes said second valve and passing a continuous flow of fluid when said first valve is moved beyond said first open position and to said second open position in which it opens said third valve, a valve operating member connected to said valve means and mounted in said casing to be actuated by said lever, said operating member being shiftable to a predetermined position to move said first valve to said first open position and being shiftable in the same direction beyond said predetermined position to move said first valve to said second open position and to open said third valve, a limit stop including a shaft rotatably mounted on said handle, a stop element on said shaft, abutment means for terminating rotation of said shaft in one direction to locate said stop element in an attitude for engaging said casing to terminate opening movement of the lever when said operating member has reached said predetermined position whereby said valve means will pass a predetermined quantity of fluid, and a trigger lever connected to said shaft and positioned to be actuated by the thumb of the user's hand grasping said handle portions to rotate said shaft in the opposite direction for swinging said stop into an ineffective position to provide for movement of said operating member by said lever beyond said predetermined position whereby said valve means will pass fluid in continuous flow.

4. Valve operating means comprising, in combination, a lever having a handle portion thereon, a support member rotatably mounted on said lever, an adjustable lever stop member threaded into said support member, spring means interconnected between said lever and said support member for biasing the latter rotatably in one direction, abutment means on said lever for terminating spring rotation of said support member to locate said stop member in operative position, a manual shifting lever connected to said support member and positioned to be operated by the hand of the user grasping said lever handle to swing said stop member against the force of said spring means into an inoperative position.

5. Valve operating means comprising, in combination, an actuating lever having a handle portion thereon, a support member movably mounted on said lever, a lever stop member adjustably mounted on said support member, spring means acting between said lever and said support member to bias the stop member into an operative position, and manual shifting means connected to said support member and positioned to be engaged by the hand of the user grasping said lever handle to shift said stop member against the force of said spring to an inoperative position.

References Cited in the file of this patent

UNITED STATES PATENTS

| | | |
|---|---|---|
| 1,789,390 | Potteiger | Jan. 20, 1931 |
| 2,042,970 | Thomas | June 2, 1936 |
| 2,120,669 | Hill | June 14, 1938 |
| 2,171,292 | Pieper | Aug. 29, 1939 |

FOREIGN PATENTS

| | | |
|---|---|---|
| 474,471 | Germany | Apr. 4, 1929 |